United States Patent Office 3,808,203
Patented Apr. 30, 1974

---

3,808,203
METHOD FOR PREPARING 4-ALKYL-1-[(5-NITRO-FURFURYLIDENE)AMINO] - 4 - IMIDAZOLIN-2-ONES
Harry R. Snyder, Jr., Norwich, N.Y., assignor to Morton-Norwich Products, Inc.
No Drawing. Filed Jan. 12, 1973, Ser. No. 323,073
Int. Cl. C07d 49/34
U.S. Cl. 260—240 A        1 Claim

ABSTRACT OF THE DISCLOSURE

A method is provided for the preparation of the titled compounds which consists in the oxidative cyclization of 5-nitro-2-furaldehyde-2-(2 - hydroxyalkyl)semicarbazones by means of a mixture of anhydrous dimethyl sulfoxide and acetic anhydride.

---

This invention relates to the preparation of 4-alkyl-1-[(5 - nitrofurfurylidene)amino] - 4 - imidazolin-2-ones which possess antibacterial activity as exemplified in the table herebelow:

IN VITRO ANTIBACTERIAL ACTIVITY IN MCG./ML.

| Organism | A | B |
|---|---|---|
| Staphylococcus aureus | 1.5 | 3.1 |
| Escherichia coli | 0.19 | 3.1 |
| Streptococcus fecalis | 3.1 | 12.5 |
| Salmonella typhosa | 0.38 | 25 |
| Corynebacterium liquifaciens | 12.5 | 12.5 |
| Shigella flexneri | 1.5 | 25 |

NOTE.—A = 4-methyl - 1 - [(5-nitrofurfurylidene)amino]-4-imidazolin-2-one. B = 4 - butyl - 1 - [(5 - nitrofurfurylidene)amino]-4-imidazolin-2-one.

The results set forth in the table above are secured through the use of the commonly used serial dilution technique for the detection of anti-bacterial activity.

The antibacterial effects possessed by these compounds make them useful as the active ingredient in the form of compositions such as dusts, elixirs, solutions, sprays, unguents and the like for the eradication or inhibition of bacterial growth.

The method which has been discovered to prepare these compounds consists in treating a solution of a 5-nitro-2-furaldehyde 2-(2-hydroxyalkyl) semicarbazone in dimethyl sulfoxide with acetic anhydride, allowing the mixture to stand, and then quenching in water whereby the 4-alkyl-1-[5-nitrofurfurylidene)amino]-4-imidazolin-2-one is obtained.

The following examples are illustrative of the method.

EXAMPLE I 4-methyl-1-[(5-nitrofurfurylidene)amino]-4-imidazolin-2-one 5-nitro - 2 - furaldehyde 2-(2 - hydroxypropyl)semicarbazone (37 g., 0.14 mole) was dissolved in anhydrous dimethyl sulfoxide (435 ml.). Acetic anhydride (290 ml.) was added and the solution was stirred at 50° C. overnight. The reaction mixture was poured into a large volume of ice and water. The brick-red precipitate was collected and washed with water. The crude product was dried to yield 26 g. (76.5%), M.P. 240–243° C. dec.

*Analysis.*—Calcd. for $C_9H_8N_4O_4$ (percent): C, 45.77; H, 3.41; N, 23.72. Found (percent): C, 45.63; H, 3.34; N, 23.46.

EXAMPLE II 4-n-butyl-1-[(5-nitrofurfurylidene)amino]-4-imidazolin-2-one

To a solution of 5-nitro-2-furaldehyde 2-(2-hydroxyhexyl)semicarbazone (59.5 g., 0.2 mole) in dry dimethyl sulfoxide (600 ml.) was added acetic anhydride (400 ml.). The resulting solution was stirred at 60° for 18 hours. The reaction mixture was poured into a large volume of ice and water. The product was collected and dried to yield 44 g. (79%), M.P. 170–173°. The material was recrystallized from nitromethane to yield 35 g., M.P. 178–179.

*Analysis.*—Calcd. for $C_{12}N_{14}N_4O_4$ (percent): C, 51.80; H, 5.07; N, 20.13. Found (percent): C, 51.93; H, 5.03; N, 19.94.

What is claimed is:
1. A method for preparing a compound of the formula:

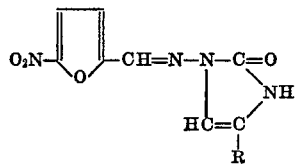

wherein R is methyl or n-butyl which consists in the oxidative cyclization of a 5-nitro-2-furaldehyde 2 - (2-hydroxypropyl or 2-hydroxyhexyl)semicarbazone by means of anhydrous dimethyl sulfoxide and acetic anhydride.

References Cited

FOREIGN PATENTS 1,167,471    7/1967    Great Britain _____ 260—240 A

OTHER REFERENCES

Hofmann: Imidazole and Its Deriviatives, part 1, frontispage and pp. 64–65, Interscience Publishers, Inc., New York (1953).

JOHN D. RANDOLPH, Primary Examiner

U.S. Cl. X.R.
424—273